United States Patent
Wang et al.

(10) Patent No.: US 8,717,376 B2
(45) Date of Patent: May 6, 2014

(54) METHOD FOR SHARING GRAPHICS CARD AMONG MULTIPLE OPERATION SYSTEMS AND COMPUTER SYSTEM

(75) Inventors: Bibo Wang, Beijing (CN); Yongfeng Liu, Beijing (CN); Chunmei Liu, Beijing (CN); Jun Chen, Beijing (CN)

(73) Assignees: Lenovo (Beijing) Limited (CN); Beijing Lenovo Software Ltd. (CN)

( * ) Notice: Subject to any disclaimer, the term of this patent is extended or adjusted under 35 U.S.C. 154(b) by 1009 days.

(21) Appl. No.: 12/316,687

(22) Filed: Dec. 16, 2008

(65) Prior Publication Data

US 2009/0153575 A1    Jun. 18, 2009

(30) Foreign Application Priority Data

Dec. 17, 2007   (CN) .......................... 2007 1 0179704

(51) Int. Cl.
 *G09G 5/36* (2006.01)
 *G06F 9/455* (2006.01)
 *G06F 15/173* (2006.01)
 *G06F 9/26* (2006.01)

(52) U.S. Cl.
 USPC ................ 345/556; 718/1; 709/223; 711/206

(58) Field of Classification Search
 USPC ......................................................... 345/556
 See application file for complete search history.

(56) References Cited

U.S. PATENT DOCUMENTS

| | | | |
|---|---|---|---|
| 7,065,630 | B1 | 6/2006 | Ledebohm et al. |
| 2005/0193396 | A1 | 9/2005 | Stafford-Fraser et al. |
| 2006/0005186 | A1 | 1/2006 | Neil |
| 2006/0236094 | A1 | 10/2006 | Leung et al. |
| 2008/0005297 | A1* | 1/2008 | Kjos et al. ..................... 709/223 |
| 2008/0077917 | A1* | 3/2008 | Chen et al. ......................... 718/1 |
| 2008/0215770 | A1 | 9/2008 | Liu et al. |
| 2008/0295095 | A1* | 11/2008 | Watanabe et al. ................ 718/1 |
| 2009/0172667 | A1 | 7/2009 | Wang et al. |

FOREIGN PATENT DOCUMENTS

CN    101059762 A    10/2007

OTHER PUBLICATIONS

"U.S. Appl. No. 11/860,939, Final Office Action mailed Oct. 27, 2011", 16 pgs.
"U.S. Appl. No. 11/860,939, Non-Final Office Action mailed Jul. 11, 2011", 10 pgs.
King, S. T., et al., "Operating System Support for Virtual Machines", Proceedings of the General Track: *2003 Usenix Annual Technical Conference* (San Antonio, TX, Jun. 9-14, 2003), 71-84.
Opferman, T., "Sharing Memory with the Virtual Machine", © 2010 United Business Meda LLC. [online]. Retrieved from the Internet: <URL: http://drdobbs.com/184402033>, (Nov. 1, 2005), 8 pgs.

* cited by examiner

*Primary Examiner* — James A Thompson
*Assistant Examiner* — Wynton S Jones
(74) *Attorney, Agent, or Firm* — Schwegman Lundberg & Woessner, P.A.

(57) ABSTRACT

The present invention provides a method for sharing a graphics card among multiple Operation Systems (OSs) and a computer system. The method comprises: detecting a first GOS to be displayed, the first GOS being one of at least two GOSs; calling a correspondence table to determine a first display control register bank corresponding to the first GOS, the first display control register bank including display mode parameters therein; controlling the first display control register bank to connect to a display output port; and displaying the first GOS based on the display mode parameters. According to the inventive method and computer system, it is possible to achieve sharing of the graphics card among the multiple OSs and quick display of the GOS to be displayed, without simulating registers of the graphics card.

15 Claims, 5 Drawing Sheets

METHOD FOR SHARING GRAPHICS CARD AMONG MULTIPLE OPERATION SYSTEMS AND COMPUTER SYSTEM

RELATED APPLICATIONS

This application claims the benefit of priority, under 35 U.S.C. Section 119, to Chinese Patent Application Serial No. 200710179704.X, filed on Dec. 17, 2007, which is incorporated herein by reference in its entirety.

BACKGROUND OF THE INVENTION

1. Field of Invention

The present invention relates to a technology of sharing a graphics card device, and more specifically, to a method for sharing a graphics card among multiple Operation Systems (OSs) and a computer system.

2. Description of Prior Art

By virtue of virtualization, it is possible to run multiple Guest Operation Systems (GOSs) on one same hardware platform. Display Contents from the multiple GOSs may be outputted to an external display device through one graphics card device so as to be displayed. That is, the multiple OSs may achieve their respective display by sharing the graphics card device.

According to a conventional technique in the virtualization field, the GOSs all use respective virtual graphics cards, and only one host OS uses the physical graphics card device. Such method has a disadvantage that the display performance of the GOSs is very poor, and many acceleration properties cannot by supported.

A recent technique provides a possibility for the GOSs to directly use the physical graphics card. However, only one GOS has the display output while the remaining OSs cannot have output through the graphics card.

To solve such problem, there have been proposed some techniques where the multiple GOSs all directly operate the physical graphics card device and they operate in a serial manner by means of some certain methods. Among them, a typical way is graphics card memory separation+register simulation. Specifically, the respective OSs use different resources of the graphics card memory, and each of them has a simulation register bank. When a certain OS needs to be displayed in the front ground, values of the registers for this OS are written into the real device, so as to display this OS.

However, the above method has the following disadvantage. Since modern graphics card registers are very complex, it is very difficult to simulate all the registers. When an OS in the back ground is using the simulation registers, if the simulation is not proper, there will be an error in the graphics card, even causing the system down.

SUMMARY OF THE INVENTION

It is an object of the present invention to provide a method for sharing a graphics card among multiple Operation Systems (OSs) and a computer system, by which it possible to achieve sharing of the graphics card among the multiple OSs without simulating registers of the graphics card.

To achieve the above object, according to an embodiment of the invention, there is provided a method for sharing a graphics card among multiple Operation Systems (OSs), the multiple OSs comprising at least two Guest Operation Systems (GOSs) and a correspondence table, the correspondence table saving a respective display control register bank corresponding to each of the GOSs, the at least two GOSs belonging to a first class of GOSs which directly access the graphics card, the method comprising:

detecting a first GOS to be displayed, the first GOS being one of the at least two GOSs;

calling the correspondence table to determine a first display control register bank corresponding to the first GOS, the first display control register bank including display mode parameters therein;

controlling the first display control register bank to connect to a display output port; and displaying the first GOS based on the display mode parameters.

Further, according to another embodiment of the invention, there is provided a computer system, comprising:

at least two Guest Operation Systems (GOSs);

a virtual machine manager, each of the at least two GOSs being connected to the virtual machine manager;

at least two display control register banks, there being a correspondence between the respective at least two display control register banks and the respective at least two GOSs, each of the at least two display control register banks being connected to one of the at least two GOSs;

at least one display output port; and a processing unit for detecting a first GOS to be displayed, and then connecting the first GOS to at least one of the at least one display output port, the first GOS being one of the at least two GOSs, wherein, the first GOS is displayed through the at least one of the at least one display output port.

According to one or more embodiment of the present invention, there are the following advantages. The respective display control register banks are allocated to the respective GOSs in advance. Thus, when displaying one certain GOS, display output for this GOS is carried out based on the display control register bank corresponding to the GOS. As a result, it is possible to eliminate difficulties caused by the need of simulating the registers of the graphics card in the prior art. Further, the display output setting parameters associated with the current displayed GOS are saved, and the display output setting parameters which are saved in advance are loaded when switching back to the GOS. Therefore, it is possible to achieve fast and convenient display.

DETAILED DESCRIPTION OF PREFERRED EMBODIMENTS

According to a method for sharing a graphics card among multiple Operation Systems (OSs) and a computer system of the present invention, it is possible for the multiple virtual OSs to share the physical graphics card by virtue of the property that the graphics card has several Display Pipes per se. Specifically, it is possible for all the multiple virtual OSs to use the physical graphics card, instead of using a virtual graphics card. Here, the display pipe is a display control register bank in the graphics card, with information on display mode parameters stored therein. The display mode parameters comprise, not limited to, resolution, refreshing rate, color depth, or information on graphics card memory used by display contents.

Hereinafter, various embodiments of the present invention are described in more detail with reference to the attached drawings.

First Embodiment

Figure 1:
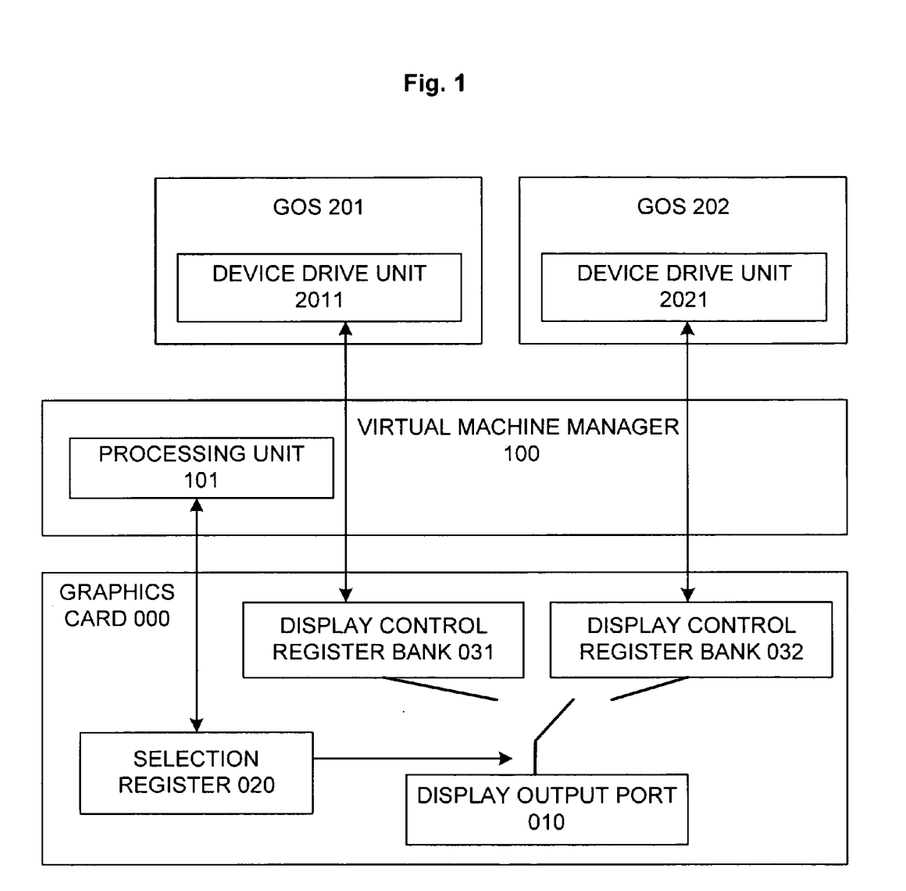
FIG. 1 is a schematic diagram showing a structure of a computer system according to a first embodiment of the present invention.

As shown in FIG. 1, a computer system according to the first embodiment of the present invention comprises multiple Guest Operations Systems (GOSs) such as GOSs 201 and 202, a virtual machine manager 100 and a graphics card 000, wherein GOSs 201 and,202 are connected to the virtual machine manager 100. GOSs 201 and 202 belong to a first class of GOSs which directly access the graphics card. The graphics card 000 comprises display control register banks 031 and 032, a display output port 010 and a selection register 020. The virtual machine manger 100 comprises a processing unit 101. GOSs 201 and 202 comprise device drive units 2011 and 2021 respectively.

GOSs 201 and 202 have respective display control register banks allocated thereto in advance. In FIG. 1, GOS 201 corresponds to the display control register bank 031, and GOS 202 corresponds to the display control register bank 032.

The device drive units 2011 and 2021 are adapted to save configuration information on the respective display control register banks corresponding to the respective GOSs, and to provide accesses to the graphics card for the respective GOSs, so as to support the respective OSs to operate the graphics card.

The processing unit 101 is adapted to connect a GOS, when detecting this GOS is to be displayed, to the display output port 010.

Here, the processing unit 101 may save the correspondence between the respective GOSs and the respective display control register banks. Further, the processing unit may determine information on the display control register bank corresponding to the GOS to be displayed based on the correspondence, and then amend the value in the selection register 020, so as to select the display control register bank for the display output port 010. Here, the processing unit 101 may be provided in the virtual machine manager 100, or otherwise, may be provided in the GOSs.

The selection register 020 is adapted to save the information on the display control register bank corresponding to the GOS to be displayed, which is determined by the processing unit 101, and then control a first display control register bank corresponding to a first GOS to connect to the display output port.

The display output port 010 is adapted to determine, based on the information on the display control register bank saved in the selection register 020, a corresponding display control register bank, and carry out display output for the GOS based on the display mode parameters in the display control register bank.

Figure 2:
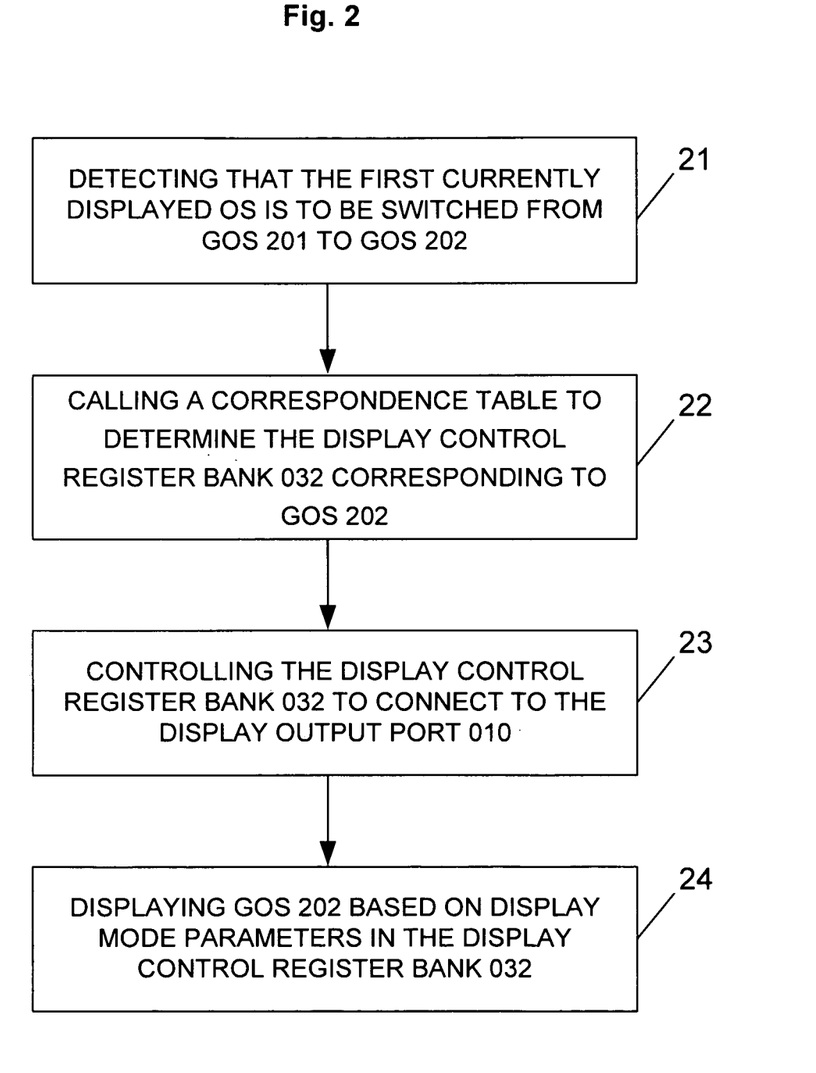
FIG. 2 is a flowchart illustrating a method for sharing a graphics card among multiple Operation Systems according to the first embodiment of the present invention.

Hereinafter, a method for sharing a graphics card among multiple OSs according to an embodiment of the present invention is described, in a case, for example, where a current displayed GOS is to be switched from GOS 201 to GOS 202. As shown in FIG. 2, the method comprises steps of:

Step 21: detecting that the current displayed GOS is to be switched from GOS 201 to GOS 202;

Step 22: calling a correspondence table to determine the display control register bank 032 corresponding to GOS 202, the correspondence table, saving the respective display control register banks corresponding to the respective GOSs;

Step 23: controlling the display control register bank 032 to connect to the display output port 010; and Step 24: displaying GOS 202 according to the display mode parameters in the display control register bank 032.

As can be seen from the above, by allocating respective display control register banks, which are the display control register banks in the graphics card itself, to the respective GOSs, it is possible to carry out display output for the respective GOSs based on the display mode parameters in the respective display control register banks. Thus, this embodiment eliminates the disadvantage caused by the need of simulating registers of the graphics card in the prior art.

Second Embodiment

The current displayed GOS may have configured with display output setting parameters. Here, the display output setting parameters refer to a current configuration for the display output port, and may comprise, not limited to, display output port Enable/Disable setting, cyclic redundant code check (CRC) setting for the display output port, synchronization setting and the like. According to the present embodiment, before switching to another GOS, the above display output setting parameters for the display output port are saved, so as to easily and quickly revert to the above configuration when switching back to the current displayed GOS.

This embodiment is described in an application of, for example, "graphics card memory separation+display pipe separation".

Figure 3:
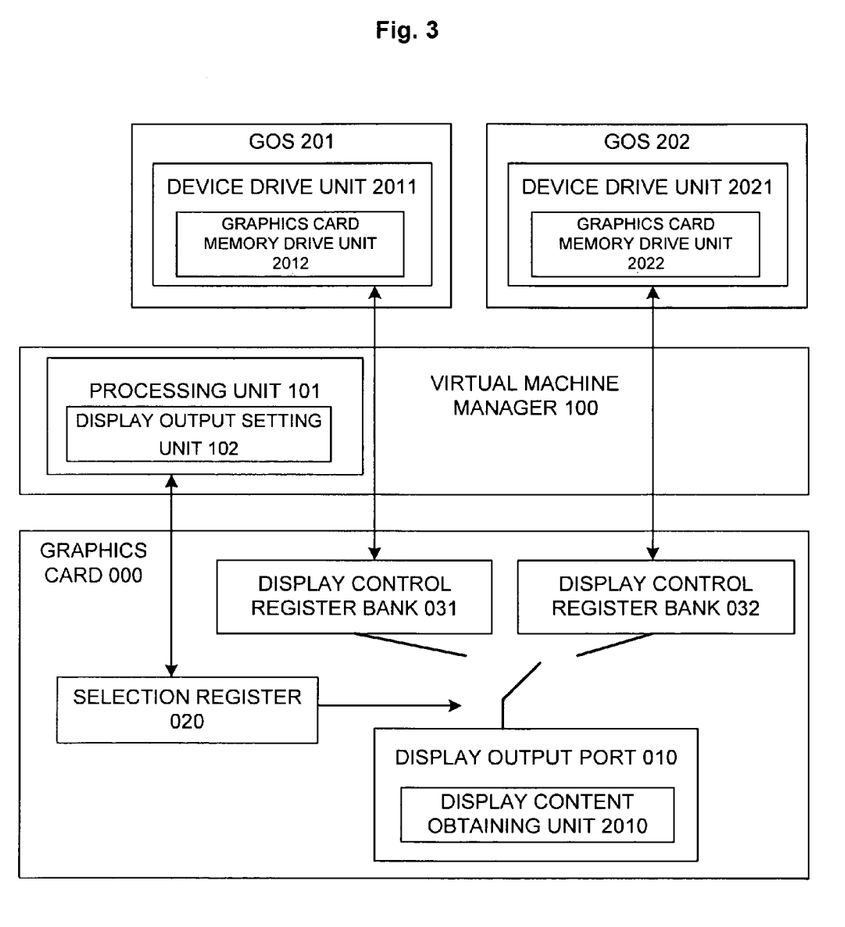
FIG. 3 is a schematic diagram showing a structure of a computer system according to a second embodiment of the present invention.

As shown in FIG. 3, a computer system according to the present embodiment, as compared with that shown in FIG. 1, further comprises graphics card memory drive units 2012 and 2022 respectively in the device drive units 2011 and 2021, a display output setting unit 102 in the processing unit 101, and a display content obtaining unit 2010 in the display output port 010.

In the present embodiment, by modifying the respective device drives of the GOSs, separate resources of the graphics card memory are allocated to the GOSs respectively. The graphics card memory drive units 2012 and 2022 are respectively adapted to save configuration information on the respective separate resources of the graphics card memory for the respective GOSs, and to provide accesses to the respective separate resources of the graphics card memory. The display content obtaining unit 2010 is adapted to obtain, based on the configuration information on the separate resource of the graphics card for the GOS to be displayed, the display content for the GOS from the corresponding area of the graphics card memory. Then, the display output port 010 carry out display output on the display content.

In the present embodiment, the display output setting unit 102 is adapted to save the display output setting parameters corresponding to the currently displayed GOS, and to load the saved display output setting parameters for the GOS to be displayed.

Accordingly, a method for sharing a graphics card among multiple OSs according to this embodiment, when switching the current displayed GOS from GOS 201 to GOS 202, comprises steps of:

Step 41, allocating the respective display control register banks to the respective GOSs in advance, and saving the correspondence between the respective GOSs and the respective display control register banks;

Step 42, allocating the respective separate resources of the graphics card memory to the respective GOSs in advance, and saving the configuration information on the respective separate resources for the respective GOSs;

Step 42, the display output setting unit 102 saving the display output setting parameters corresponding to the current displayed GOS;

Step 43, the display output setting unit 102 loading the display output setting parameters corresponding to the GOS to be displayed, which are saved in advance;

Step 43, the processing unit determining, based on the correspondence, that the display control register bank corresponding to GOS 202 to be displayed is the display control register bank 032;

Step 44, the display content obtaining unit 2010 obtaining, based on the configuration information on the separate resource of the graphics card memory for GOS 202 to be displayed, the display content for the GOS from the corresponding area of the memory; and Step 45, after obtaining the display content for GOS 202 to be displayed, the display output port 010 carrying out display output for GOS 202 based on the display mode parameters in the display control register bank 032.

Third Embodiment

There may be several display output ports in the graphics card device. In such case, display output for different GOSs may be carried out through the respective display output ports.

Figure 4:
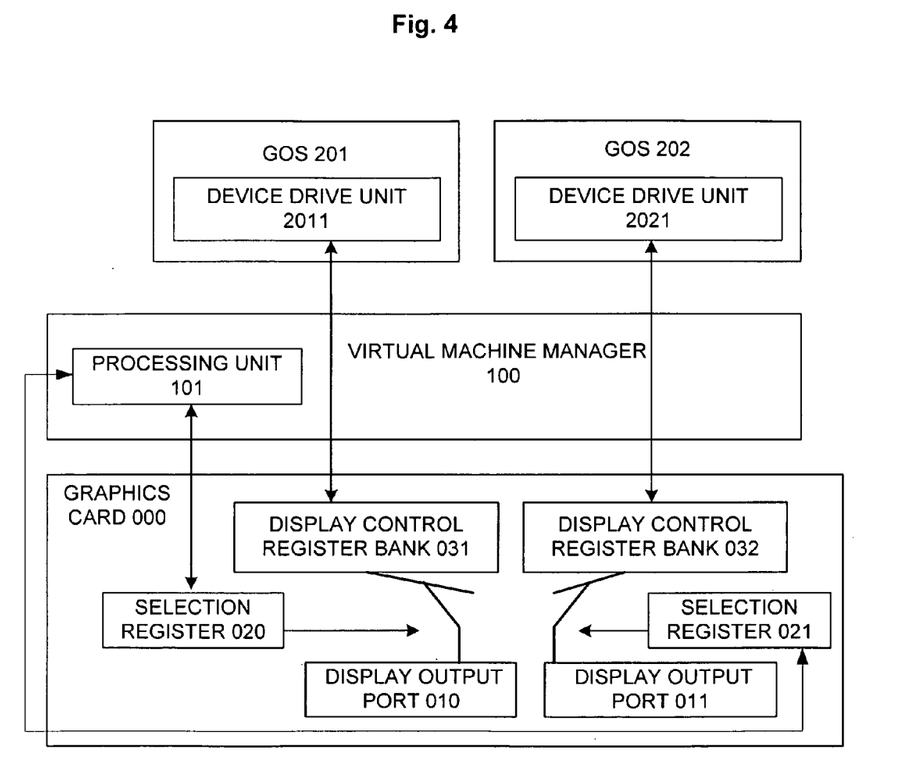
FIG. 4 is a schematic diagram showing a structure of a computer system according to a third embodiment of the present invention.

Referring to FIG. 4, a computer system according to this embodiment comprises two display output ports, display output port 010 and display output port 011, and two selection registers 020 and 021 corresponding to the two display output ports respectively.

In this embodiment, the processing unit 101 may configure the selection registers 020 and 021 to select the respective display control register banks for the respective display output ports. Thus, it is possible to carry out display output for several GOSs to be displayed respectively through the several display output ports of the graphics card.

Fourth Embodiment

The number of the display control register banks in the graphics card is limited. When the number of the OSs exceeds the number of the display control register banks, a GOS may simulate the graphics card to provide a virtual graphics card for other GOSs, so as to provide accesses to the graphics card for the other GOSs.

Figure 5:
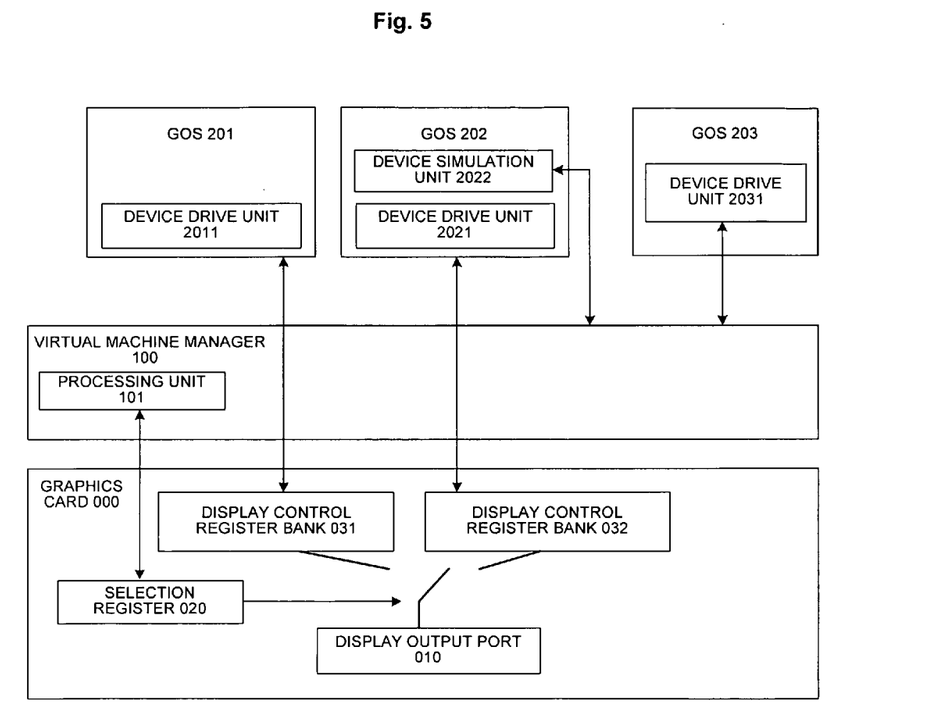
FIG. 5 is a schematic diagram showing a structure of a computer system according to a fourth embodiment of the present invention.

As shown in FIG. 5, there are 2 display control register banks and 3 GOSs. GOS 202 comprises a device simulation unit 2022, and GOS 203 comprises a device drive unit 2031. The virtual machine manger 100 comprises a communication unit 102. In such case, the device simulation unit 2022 and the device drive unit 2031 may be connected through the communication unit 102.

Here, GOS 203 belongs to a second class of GOSs which indirectly access the graphics card through the first class of GOSs such as GOS 201 or 202.

The device drive unit 2031 sends a command of accessing the graphics card by GOS 203 to the device simulation unit 2022 through the communication unit 102. The device simulation unit 2022 is adapted to simulates the graphics card for GOS 203, and provide accesses to the graphics card 000 for GOS 203 through the device drive unit 2021. As a result, it is possible to carry out display output for GOS 203 through GOS 202.

Those described above are only embodiments of the present invention. It should be noted that, for those skilled in the art, there may be various modifications and improvements without departing from the principle of the invention. Such modifications and improvements fall into the scope of the present invention.

What is claimed is:

1. A method for sharing a graphics card among multiple Operation Systems (OSs) of a computer system which comprises the multiple OSs, a virtual machine manager and the graphics card, the multiple OSs comprising at least two Guest Operation Systems (GOSs) and a correspondence table, the correspondence table saving a respective display control register bank corresponding to each of the GOSs, the at least two GOSs comprising a first GOS belonging to a first class of GOSs which directly access the graphics card without involving a virtual machine manager and a second GOS belonging to a second class of GOSs which indirectly access the graphics card through one of the first class of GOSs via the virtual machine manager, the method comprising:

detecting the first GOS to be displayed;

calling the correspondence table to determine a first display control register bank corresponding to the first GOS, the first display control register bank including display mode parameters therein;

controlling the first display control register bank to connect to a display output port of the graphics card;

displaying the first GOS based on the display mode parameters;

receiving at the one of the first class of GOSs a command of accessing the graphics card transmitted from the second GOS via the virtual machine manager; and carrying out display output for the second GOS through the first GOS by the one of the first class of GOSs stimulating the graphics card for the second GOS and providing accesses to the graphics card for the second GOS.

2. The method according to claim 1, wherein the method further comprises, before displaying the first GOS based on the display mode parameters:

allocating a separate resource of a graphics card memory to the first GOS, and saving configuration information on the separate resource of the graphics card memory for the first GOS.

3. The method according to claim 2, wherein the step of displaying the first GOS based on the display mode parameters comprises:

obtaining, based on the configuration information on the separate resource of the graphics card memory for the first GOS to be displayed, a display content for the first GOS from a corresponding area of the graphics card memory; and carrying out display output on the display content for the first GOS based on the display mode parameters in the first display control register bank corresponding to the first GOS to be displayed.

4. The method according to claim 3, wherein the method further comprises:

the information on the resource of the graphics card memory allocated to the first GOS is saved in the first display control register bank corresponding to the first GOS.

5. The method according to claim 1, wherein, the multiple as further comprise a second GOS belonging to a second class of GOSs which indirectly access the graphics card through the first class of GOSs, and the method further comprises, after carrying out display output for the first GOS based on the display mode parameters:

the first GOS simulating the graphics card for the second GOS, and carrying out display output for the second GOS through the first GOS.

6. The method according to claim 1, wherein the method further comprises, before displaying the first GOS based on the display mode parameters:

saving display output setting parameters corresponding to the current displayed GOS, and loading display output setting parameters for the first GOS which are stored in advance.

7. The method according to claim 1, wherein there is one or more display output port(s).

8. The method according to claim 1, wherein the display mode parameters comprise resolution, refreshing rate, color depth, or information on the graphics card memory used by the display content.

9. A computer system, comprising:
a graphics card having at least one display output port;
at least two Guest Operation Systems (GOSs), comprising a first GOS belonging to a first class of GOSs which directly access the graphics card without involving a virtual machine manager and a second GOS belonging to a second class of GOSs which indirectly access the graphics card through one of the first class of GOSs via the virtual machine manager;
a virtual machine manager, the second GOS being connected to one of the first class of GOSs via the virtual machine manager;
at least two display control register banks, there being a correspondence between the respective at least two display control register banks and the respective at least two GOSs, each of the at least two display control register banks being connected to one of the at least two GOSs; and
a processing unit for detecting the first GOS to be displayed, and then connecting the first GOS to at least one of the at least one display output port, wherein, the first GOS is displayed through the at least one of the at least one display output port, and
wherein the second GOS is configured to transmit a command of accessing the graphics card to the one of the first class of GOSs via the virtual machine manager, and the one of the first class of GOSs carries out display output for the second GOS through the first GOS by the one of the first class of GOSs simulating the graphics card for the second GOS and providing accesses to the graphics card for the second GOS.

10. The computer system according to claim 9, further comprising a selection register for controlling a first display control register bank corresponding to the first GOS to connect to the display output port.

11. The computer system according to claim 9, wherein the at least two GOSs have respective device drive units provided therein for saving configuration information on the respective display control register banks corresponding to the respective GOSs and for providing accesses to the graphics card for the respective GOSs.

12. The computer system according to claim 11, wherein the device drive unit comprises a graphics card memory drive unit for allocating a separate resource of the graphics card memory to the first GOS and for saving configuration information on the separate resource of the graphics card memory for the first GOS.

13. The computer system according to claim 12, wherein the display output port obtains, based on the configuration information on the separate resource of the graphics card memory for the first GOS to be displayed, a display content for the first GOS from a corresponding area of the graphics card memory, and carries out display output on the display content for the first GOS based on display mode parameters in the first display control register bank corresponding to the first GOS to be displayed.

14. The computer system according to claim 9, wherein the processing unit further comprises a display output setting unit for saving display output setting parameters corresponding to the current displayed GOS, and for loading display output setting parameters for the first GOS which are stored in advance, before displaying the first GOS.

15. The computer system according to claim 9, wherein there is one or more display output port(s).

* * * * *

UNITED STATES PATENT AND TRADEMARK OFFICE
CERTIFICATE OF CORRECTION

| | | |
|---|---|---|
| PATENT NO. | : 8,717,376 B2 | Page 1 of 1 |
| APPLICATION NO. | : 12/316687 | |
| DATED | : May 6, 2014 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1152 days.

Signed and Sealed this
Eighth Day of September, 2015

Michelle K. Lee
*Director of the United States Patent and Trademark Office*